United States Patent
Kato et al.

(10) Patent No.: US 11,929,544 B2
(45) Date of Patent: Mar. 12, 2024

(54) WIRELESS COMMUNICATION DEVICE USING A RADIO FREQUENCY IDENTIFICATION (RFID) TECHNOLOGY FOR DATA COMMUNICATION IN A NON-CONTACT MANNER BY AN INDUCTION ELECTROMAGNETIC FIELD OR A RADIO WAVE

(71) Applicant: Murata Manufacturing Co., Ltd., Nagaokakyo (JP)

(72) Inventors: Noboru Kato, Nagaokakyo (JP);
Yoshihiro Aoyama, Nagaokakyo (JP);
Mikiko Saito, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 421 days.

(21) Appl. No.: 17/395,595

(22) Filed: Aug. 6, 2021

(65) Prior Publication Data

US 2021/0367325 A1    Nov. 25, 2021

Related U.S. Application Data

(63) Continuation of application No. PCT/JP2020/032065, filed on Aug. 25, 2020.

(30) Foreign Application Priority Data

Nov. 28, 2019    (JP) ................................ 2019-215474

(51) Int. Cl.
*H01Q 1/22* (2006.01)
*G06K 19/077* (2006.01)
(Continued)

(52) U.S. Cl.
CPC ..... *H01Q 1/2283* (2013.01); *G06K 19/07773* (2013.01); *H01Q 5/364* (2015.01); *H01Q 7/00* (2013.01)

(58) Field of Classification Search
CPC .......... H01Q 1/2225; H01Q 7/00; H01Q 1/38; H01Q 9/285; H01Q 9/26; H01Q 1/48;
(Continued)

(56) References Cited

U.S. PATENT DOCUMENTS

| 10,013,650 | B2* | 7/2018 | Murayama | ....... G06K 19/07749 |
| 10,658,847 | B2* | 5/2020 | Peralta | ..................... H02J 50/80 |

(Continued)

FOREIGN PATENT DOCUMENTS

| JP | 2006338563 A | 12/2006 |
| JP | 2018163643 A | 10/2018 |

(Continued)

OTHER PUBLICATIONS

International Search Report issued for PCT/JP2020/032065, dated Nov. 2, 2020.

*Primary Examiner* — Golam Sorowar
(74) *Attorney, Agent, or Firm* — ArentFox Schiff LLP

(57) ABSTRACT

A wireless communication device is provided for transmitting and receiving a high-frequency signal having a first frequency for communication is disclosed. The device includes a loop pattern having a first electrode and a second electrode as both ends, an antenna pattern, a third electrode capacitively coupled to the first electrode, and a fourth electrode capacitively coupled to the second electrode. The device includes an RFIC having a capacitive impedance at a second frequency higher than the first frequency, and a first current path and a second current path connected in parallel with each other between the third electrode and the fourth electrode. The RFIC is included in the first current path and the second current path has an inductive impedance at a second frequency.

20 Claims, 11 Drawing Sheets

(51) Int. Cl.
*H01Q 5/364* (2015.01)
*H01Q 7/00* (2006.01)

(58) Field of Classification Search
CPC ...... H01Q 1/2208; H01Q 1/40; H01Q 9/0407;
H01Q 1/36; H01Q 9/16; H01Q 13/10;
H01Q 9/42; H01Q 1/243; H01Q 5/335;
H01Q 9/065; H01Q 1/2283; H01Q 1/22;
H01Q 1/2216; H01Q 1/44; H01Q 1/521;
H01Q 11/08; H01Q 23/00; H01Q 9/045;
H01Q 9/0457; H01Q 1/42; H01Q 9/30;
H01Q 1/248; H01Q 1/50; H01Q 25/005;
G06K 19/07749; G06K 19/07786; G06K
19/07771; G06K 19/07773; G06K
19/0723; G06K 19/077; G06K 19/07756;
G06K 19/07783; G06K 19/07779; G06K
19/07758; G06K 19/0775; G06K
19/07722; G06K 19/07784; G06K
19/07794; G06K 19/0772; G06K
19/07754; G06K 19/07775; G06K 19/07;
H01L 2224/16225; H01L 2223/6677;
H01L 23/66; H01L 2224/16227; H01L
2224/73204; H01L 2924/00; H01L
2224/32225; H01L 23/552; H01L
2924/3011; H01L 2924/19105; H01L
2223/6655; H01L 2224/48091; H01L
2224/48227; H01L 23/49838; H01L
2924/00014

See application file for complete search history.

(56) References Cited

U.S. PATENT DOCUMENTS

| | | |
|---|---|---|
| 2018/0189623 A1 | 7/2018 | Forster et al. |
| 2018/0321059 A1* | 11/2018 | Komiyama ............... H01G 4/40 |
| 2019/0081402 A1 | 3/2019 | Kato |
| 2019/0173180 A1* | 6/2019 | Kai ........................ H01Q 21/28 |

FOREIGN PATENT DOCUMENTS

| | | |
|---|---|---|
| WO | 2018194173 A1 | 10/2018 |
| WO | 2018194174 A1 | 10/2018 |

* cited by examiner

WIRELESS COMMUNICATION DEVICE USING A RADIO FREQUENCY IDENTIFICATION (RFID) TECHNOLOGY FOR DATA COMMUNICATION IN A NON-CONTACT MANNER BY AN INDUCTION ELECTROMAGNETIC FIELD OR A RADIO WAVE

CROSS REFERENCE TO RELATED APPLICATIONS

The present application is a continuation of PCT/JP2020/032065 filed Aug. 25, 2020, which claims priority to Japanese Patent Application No. 2019-215474, filed Nov. 28, 2019, the entire contents of each of which are incorporated herein by reference.

TECHNICAL FIELD

The present invention relates to a wireless communication device including an antenna, and more particularly, to a wireless communication device using a radio frequency identification (RFID) technology for data communication in a non-contact manner by an induction electromagnetic field or a radio wave.

BACKGROUND

Currently, in supermarkets, restaurants, and the like, product management can be performed with an RFID tag, which is a wireless communication device, attached to an article that is a product. According to the product management using the RFID tag, a plurality of products attached with the RFID tags can be checked out at a time, and the checkout time can be shortened.

Specific food and edible products are included in the general types of products. In some cases, such a product is warmed immediately after purchase of the product in a store and the purchaser eats/drinks immediately on the spot. In some cases, a product is warmed and served to the purchaser in a restaurant. These products are heated using an electromagnetic wave heating device, such as a microwave oven.

The RFID tag has, together with a radio-frequency integrated circuit (RFIC), a metal material such as an antenna pattern, which is a metal film body, formed on an insulation substrate such as a paper material or a resin material. When a product is heated by a microwave oven in a state where such an RFID tag is attached, for example, when a packed lunch attached with the RFID tag is heated, electromagnetic waves from the microwave oven are absorbed by the RFID tag together with the packed lunch. Due to this operation, an electric field is concentrated and discharged in the metal material portion of the RFID tag, or an overcurrent flows in the metal material portion. As a result, there is a risk that the metal itself is heated and sublimated, or the paper material or resin material constituting the RFID tag ignites, whereby the RFID tag ignites.

For the purpose of reducing ignition in the RFID tag, JP 2006-338563 A (hereinafter "Patent Document 1") proposes a configuration of a flame-retardant tag.

In the "flame-retardant tag" disclosed in Patent Document 1, a base material on which an RFIC chip and an antenna pattern are mounted is made of a flame-retardant material. Since a flame-retardant material is used as the base material, even if the base material ignites, the fire can be extinguished within several seconds to several ten seconds. However, there is a possibility of continuous discharge in the metal material portion formed on the base material, which may cause the base material to ignite again and the product to catch fire.

SUMMARY OF THE INVENTION

Accordingly, it is an object of the exemplary embodiments of the present invention to provide a wireless communication device that suppresses ignition in a product attached with a wireless communication device even when the product attached with the wireless communication device is irradiated with an electromagnetic wave having a frequency higher than a predetermined communication frequency.

Thus, a wireless communication device of one exemplary aspect is provided for transmitting and receiving a high-frequency signal having a first frequency for communication. In this aspect, the wireless communication device includes a first electrode; a second electrode arranged at an interval from the first electrode; a loop pattern having the first electrode and the second electrode as both ends; an antenna pattern connected to the loop pattern; a third electrode capacitively coupled to the first electrode; a fourth electrode capacitively coupled to the second electrode; an RFIC having a capacitive impedance at a second frequency higher than the first frequency; and a first current path and a second current path connected in parallel with each other between the third electrode and the fourth electrode. Moreover, the RFIC is included in the first current path, and the second current path has an inductive impedance at a second frequency.

A wireless communication device of another exemplary aspect is provided for transmitting and receiving a high-frequency signal having a first frequency for communication. In this aspect, the wireless communication device includes a first electrode; a second electrode arranged at an interval from the first electrode; a loop pattern having the first electrode and the second electrode as both ends; an antenna pattern connected to the loop pattern; a third electrode capacitively coupled to the first electrode; a fourth electrode capacitively coupled to the second electrode; a first current path and a second current path connected in parallel with each other between the third electrode and the fourth electrode; a first resonance circuit including the first current path and the second current path, and having an impedance characteristic of resonating at the first frequency and short-circuiting at a second frequency higher in frequency than the first frequency; a second resonance circuit including the loop pattern and the second current path, and resonating at the first frequency; and an RFIC included in the first current path. Moreover, in this aspect, the antenna pattern and the second resonance circuit resonate at the second frequency or at a frequency higher than the second frequency.

According to the present invention, a wireless communication device is provided that suppresses ignition in a product even when the product with the wireless communication device attached is irradiated with an electromagnetic wave having a frequency higher than a predetermined communication frequency.

BRIEF DESCRIPTION OF THE DRAWINGS

FIG. 5a is a plan view of a conductor pattern formed on a top surface of the substrate of the RFIC module. FIG. 5b is a perspective plan view of the conductor pattern formed on a bottom surface of the substrate viewed from above.

DETAILED DESCRIPTION

Figure 1:
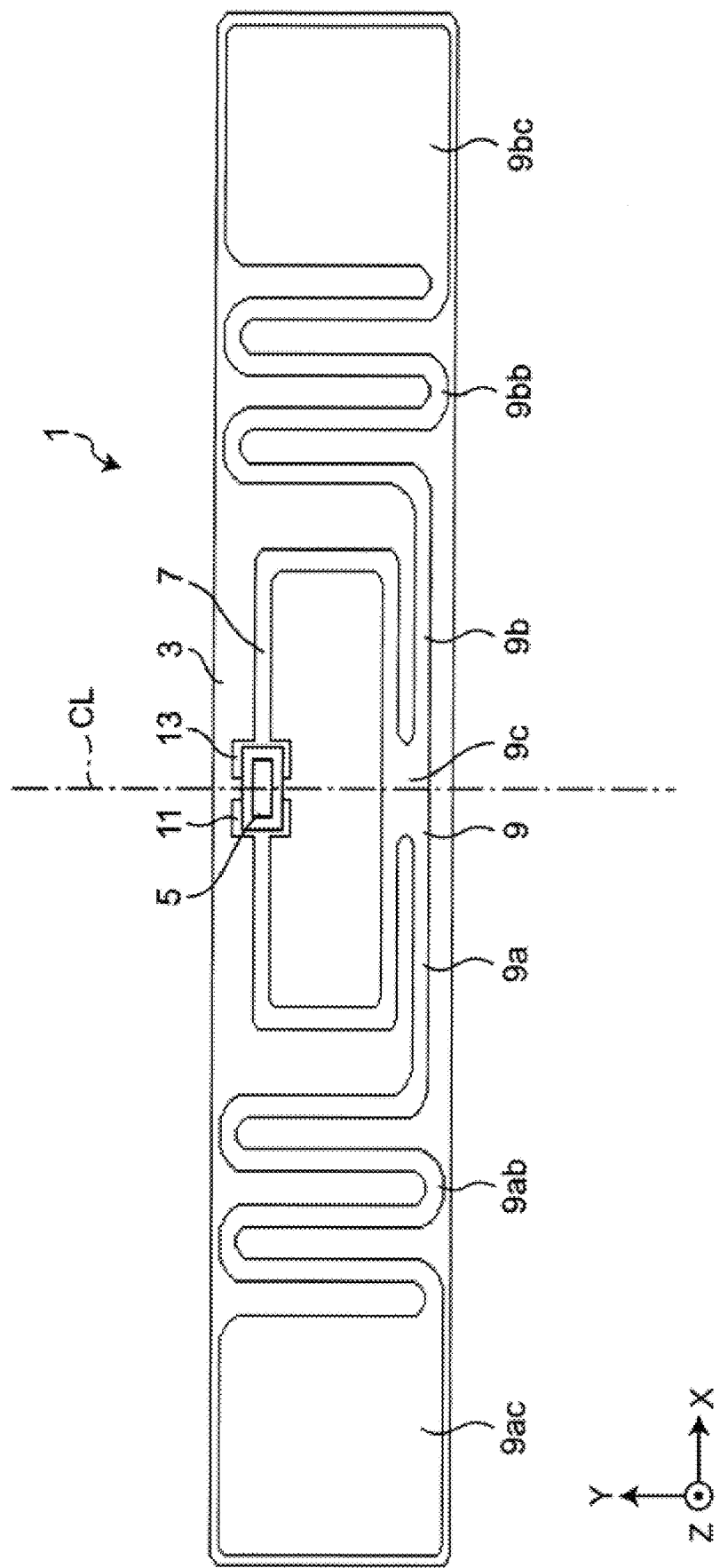
FIG. 1 is a plan view showing an RFID tag that is a wireless communication device of a first exemplary embodiment.

A wireless communication device according to one exemplary aspect is provided for transmitting and receiving a high-frequency signal having a first frequency for communication. In this aspect, the device includes a first electrode; a second electrode arranged at an interval from the first electrode; a loop pattern having the first electrode and the second electrode as both ends; an antenna pattern connected to the loop pattern; a third electrode capacitively coupled to the first electrode; a fourth electrode capacitively coupled to the second electrode; an RFIC having a capacitive impedance at a second frequency higher than the first frequency; and a first current path and a second current path connected in parallel with each other between the third electrode and the fourth electrode. Moreover, the RFIC is included in the first current path, and the second current path has an inductive impedance at a second frequency.

The wireless communication device of this aspect includes the first current path and the second current path, the RFIC is included in the first current path, has the capacitive impedance at the second frequency, and the second current path has the inductive impedance at the second frequency. Therefore, when the antenna pattern receives the electromagnetic wave of the second frequency, a current flows through the second current path between the third electrode and the fourth electrode, and hence a high voltage can be prevented from being applied to the first current path. Therefore, the electromagnetic wave of the second frequency can suppress a voltage from being applied to the RFIC, and can prevent the RFIC from being broken. Therefore, even after irradiated with the electromagnetic wave of the second frequency, the wireless communication device can perform data communication without breakage of the IC.

A wireless communication device of one exemplary is provided for transmitting and receiving a high-frequency signal having a first frequency for communication. In this aspect, the device includes a first electrode; a second electrode arranged at an interval from the first electrode; a loop pattern having the first electrode and the second electrode as both ends; an antenna pattern connected to the loop pattern; a third electrode capacitively coupled to the first electrode; a fourth electrode capacitively coupled to the second electrode; a first current path and a second current path connected in parallel with each other between the third electrode and the fourth electrode; a first resonance circuit including the first current path and the second current path, and having an impedance characteristic of resonating at the first frequency and short-circuiting at a second frequency higher in frequency than the first frequency; a second resonance circuit including the loop pattern and the second current path, and resonating at the first frequency; and an RFIC included in the first current path. Moreover, the antenna pattern and the second resonance circuit resonate at the second frequency or at a frequency higher than the second frequency.

In the wireless communication device of this aspect, both the first resonance circuit and the second resonance circuit resonate in parallel with the high-frequency signal of the first frequency, which causes the voltage between both ends of the RFIC to become higher, and hence the communication characteristics are good. In addition, a circuit including the antenna pattern and the second resonance circuit resonates with respect to an electromagnetic wave having the second frequency higher than the first frequency or having a frequency higher than the second frequency, and hence the circuit has an inductive impedance characteristic at the second frequency, but the first resonance circuit has an impedance characteristic that becomes a short circuit when the impedance is viewed from the RFIC side, thereby hardly generating a potential difference. Since both the first resonance circuit and the second resonance circuit include the second current path, a current flows in the second current path with respect to the electromagnetic wave of the second frequency, and hence a high voltage can be prevented from being applied to the first current path including the RFIC, and it is also possible to prevent the RFIC from being broken. Therefore, even after irradiated with the electromagnetic wave of the second frequency or a frequency higher than the second frequency, the wireless communication device can perform data communication without breakage of the IC.

In one aspect, the antenna pattern may have an electrical length of ½ wavelength of the electromagnetic wave of the second frequency. This configuration maximizes the radiation resistance value of the antenna pattern, and it is possible to re-radiate the electromagnetic wave energy without loss by increasing the reactive current by increasing the ratio of the antenna pattern, the loop pattern, and the conductor resistance of the first current path and the second current path. Therefore, it is possible to reduce the effective current flowing through the antenna pattern, the loop pattern, the first current path, and the second current path, and it is possible to reduce the amount of heat generated from these.

In one aspect, the pattern width of the loop pattern may be larger than the pattern width of the antenna pattern. This configuration reduces the conductor resistance of the loop antenna as compared with the antenna pattern, and makes the voltage applied to the loop antenna smaller than the voltage applied to the antenna pattern even when the electromagnetic wave of the second frequency is irradiated.

The impedance of the RFIC at the first frequency may be capacitive in an exemplary aspect.

The circuit including the antenna pattern, the loop pattern, and the second current path may be a resonance circuit that resonates at the second frequency in an exemplary aspect.

The circuit including the first current path and the second current path may be a non-resonant circuit at the second frequency in an exemplary aspect.

The antenna pattern may be line-symmetrical with respect to a center line passing through the center of the RFIC in plan view in an exemplary aspect.

In an exemplary aspect the wireless communication device includes a base material on which the antenna pattern and the loop pattern are formed, and the base material may not shrink even when the electromagnetic wave of the second frequency is irradiated.

The first frequency may be a frequency of a UHF band in an exemplary aspect.

The first frequency may be a frequency of a HF band in an exemplary aspect.

The second frequency may be a frequency used for electromagnetic wave heating in an exemplary aspect.

First, an outline of the exemplary embodiments of the present invention will be described. The RFID tag as the wireless communication device can transmit and receive high-frequency signals (i.e., wireless signals) in a communication frequency band. Furthermore, a situation may occur in which the RFID tag is irradiated with electromagnetic waves of a heating frequency used in, for example a "microwave oven", which is an electromagnetic wave heating device.

In the metal antenna pattern included in the RFID tag, depending on the relationship between the radiation resistance and the metal resistance, the energy of the electromagnetic wave received from the microwave oven is divided into the energy of re-radiating the received electromagnetic wave from the antenna pattern and the energy of generating heat in the antenna pattern. Here, the re-radiating energy is large when the radiation resistance of the antenna pattern is large, and the amount of heat generated in the antenna pattern is large when the metal resistance of the antenna pattern is large.

Since the radiation resistance of the antenna pattern becomes maximum when the overall length of the antenna pattern is ½ wavelength of the radio wave of the received frequency, it becomes maximum when the antenna pattern has the shape of a dipole antenna. Ideally, the larger the radiation resistance is than the metal resistance in the ratio between the radiation resistance and the metal resistance in the antenna pattern, the more the amount of energy in which the electric power input to the antenna is consumed by the radiation resistance increases, the more the electromagnetic wave energy received from the microwave oven is re-radiated, and it is possible to suppress the heat generation in the antenna pattern. Therefore, a metal having a small resistance value is selected as the material of the metal antenna pattern according to an exemplary aspect.

Moreover, the antenna pattern preferably has a shape in which a loop pattern is added to a dipole antenna pattern. Impedance matching between the antenna pattern and the RFIC in a communication frequency is performed by forming a minute gap on the loop pattern and mounting the RFIC on two electrodes at both ends of the loop pattern arranged so as to sandwich the gap.

However, when an overcurrent due to the electromagnetic wave from the microwave oven is generated in the loop pattern, a high voltage is generated in the gap portion between the electrodes. Since the RFIC has a capacitive component, the voltage can be reduced by reducing the impedance of the gap between the electrodes at the frequency of the electromagnetic wave from the microwave oven. However, since the withstand voltage of the capacitive element in the RFIC is about 1 kV, the capacitive element in the RFIC is broken and does not operate when a high voltage causing discharge even for a moment is applied. Depending on the break mode of the RFIC, the RFIC has a resistive component, and heat generation may occur in the RFIC, or discharge may occur at both ends of the RFIC or in the gap portion between the electrodes.

Then, an electrode pattern forming a capacitive element between the RFIC and the electrode is formed in the gap portion between the electrodes, and a new impedance matching circuit including this pattern is added. Thus, the impedance between the electrodes is reduced by the capacitive element with respect to the high voltage generated in the gap portion between the electrodes by the electromagnetic wave from the microwave oven to prevent the generation of the high voltage. At this time, the capacitive element is formed via a dielectric base material having a high withstand voltage so that the capacitive element is not broken by the withstand voltage.

By using, in the impedance matching circuit, the pattern of this capacitive element as a part of the inductor, the high voltage by the microwave oven is applied to the pattern of the capacitive element, but the high voltage in the gap portion between the electrodes is applied to the entire surface of the capacitive element by the opposed capacitive element, and hence discharge does not occur in the gap portion between the electrodes. Moreover, the potential difference at the both ends in the inductance pattern formed between the capacitive elements becomes small. Therefore, a high voltage can be prevented from being applied to the matching circuit configured with the inductance pattern as a part of the matching circuit. This configuration makes it possible to perform impedance matching with the RFIC element as an antenna pattern of a communication frequency band, and to configure an RFID tag in which the high voltage by the microwave oven is not applied to the RFIC.

An exemplary embodiment as a specific example of the wireless communication device will be described below with reference to the accompanying drawings. In the drawings, members having substantially the same functions and configurations are denoted by the same reference numerals, and the description thereof may be omitted in the description. The drawings schematically present mainly each component in order to facilitate understanding.

It is noted that any embodiment described below is an example of the present invention, and the present invention is not limited to this configuration. The numerical values, shapes, configurations, steps, orders of steps, and the like specifically shown in the following embodiments are mere examples, and the present invention is not limited thereto. In all embodiments, the configurations in variations are the same, and the configurations described in the variations may be combined.

As for the product to which the wireless communication device according to the present invention is attached, for example, all products handled in stores such as a "convenience store" and a "supermarket" are targeted. It also targets foods cooked in a central kitchen. The foods cooked in a central kitchen is reheated and served in restaurants and facilities. In the description below, the electromagnetic wave heating device described in the following embodiments is a "microwave oven", which performs dielectric heating as an example, and the electromagnetic wave heating device in the present invention targets a heating device having a function of performing dielectric heating. The exemplary embodiments of the present invention relates to a product sales system and a food and drink serve system in which the wireless communication devices having the same configuration are attached to all products.

When the relative permittivity εr of the antenna base material satisfies εr>1, the electrical lengths of the antenna pattern and the conductor pattern become longer with respect to the physical length. In this description, the physical length refers to a line length formed on an antenna base material. It is noted that the electrical length is a length in consideration of shortening or extending of the wavelength due to a relative permittivity or a parasitic reactance component.

First Exemplary Embodiment

Figure 2:
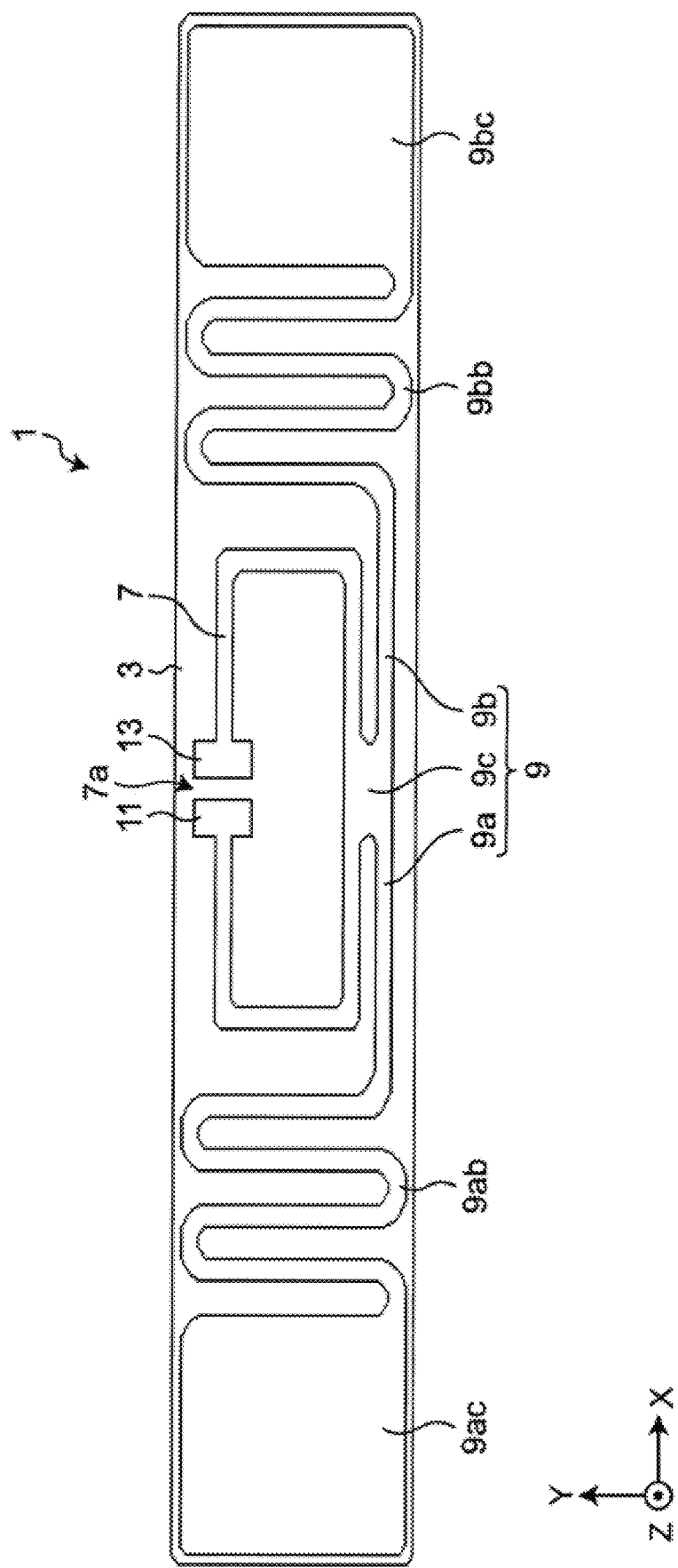
FIG. 2 is a plan view showing the RFID tag in FIG. 1 from which an RFIC module is removed.

Next, a schematic configuration of an RFID tag 1, which is a wireless communication device according to the present disclosure will be described. FIG. 1 is a plan view showing the RFID tag 1, which is a wireless communication device of the first exemplary embodiment. FIG. 2 is a plan view showing the RFID tag 1 in FIG. 1 from which an RFIC module 5 is removed. In the figures, the X-Y-Z coordinate system is to facilitate understanding of the invention, and does not limit the invention. For example, the X-axis direction indicates the longitudinal direction of the RFID tag 1, the Y-axis direction indicates the depth (e.g., width) direction, and the Z-axis direction indicates the thickness direction. The X, Y, and Z directions are orthogonal to one another.

The RFID tag 1 of the first embodiment is a wireless communication device configured to perform wireless communication (i.e., transmission and reception) with a high-frequency signal having a communication frequency (e.g., a carrier frequency) as a first frequency. The RFID tag 1 is configured to perform wireless communication with a high-frequency signal having a frequency for communication in the UHF band, for example. Here, the UHF band is a frequency band from 860 MHz to 960 MHz.

As shown, the RFID tag 1 includes a base material 3, which is a dielectric, the RFIC module 5, a loop pattern 7 electrically connected to the RFIC module 5, and an antenna pattern 9 directly connected to the loop pattern 7. The loop pattern 7 has a partially interrupted gap portion 7a. The gap portion 7a is, for example, about 1 mm. The RFID tag 1 includes a first electrode 11 and a second electrode 13 serving as both ends of the loop pattern 7, and the gap portion 7a is formed between the first electrode 11 and the second electrode 13 as shown in FIG. 2.

As the base material 3, for example, a film material having flexibility such as polyethylene terephthalate (PET) film or a flexible substrate, such as polyimide is used. It is noted that the base material 3 is not limited to the rectangular shape as shown in FIG. 1, but may be an elliptical shape or a circular shape, for example.

The loop pattern 7 and the antenna pattern 9 made of a film body of a conductive material, such as an aluminum foil or a copper foil, are formed on the surface of the base material 3. The radiation resistance can be increased by using a metal having a small resistance value such as aluminum or copper as the antenna pattern 9.

The antenna pattern 9 has a first antenna pattern 9a extending outward in the longitudinal direction (−X direction) from a connection portion 9c with the loop pattern 7, and a second antenna pattern 9b extending in the opposite direction (+X direction) to the first antenna pattern 9a from the connection portion 9c. The antenna pattern 9 is configured as a dipole antenna by the first and second antenna patterns 9a and 9b. The first and second antenna patterns 9a and 9b are arranged in a positional relationship line-symmetrical with respect to a center line CL passing through a substantially center of the RFIC module 5, for example.

The first antenna pattern 9a has a meander-shaped wiring pattern 9ab having a plurality of folded portions and meandering, and a flat plate-shaped wiring pattern 9ac outside the wiring pattern 9ab. The second antenna pattern 9b also has a meander-shaped wiring pattern 9bb having a plurality of folded portions and meandering, and a flat plate-shaped wiring pattern 9bc longitudinally outside the wiring pattern 9bb.

The overall length of the antenna pattern 9, i.e., the electrical overall length obtained by adding the lengths of both the first and second antenna patterns 9a and 9b, has a length of ½ wavelength of a high frequency of the second frequency higher than the first frequency for communication. Thus, assuming that the RFID tag 1 is irradiated with a high frequency of the second frequency, the electrical and physical overall lengths of the antenna pattern 9 are designed to reflect the high frequency of the second frequency. Therefore, when the RFID tag 1 is irradiated with a radio wave of the second frequency higher than the first frequency, the antenna pattern 9 can reflect the electromagnetic wave of the second frequency because the antenna pattern 9 has a length of ½ wavelength with respect to the electromagnetic wave of the second frequency, and the induced current hardly flows through the antenna pattern 9. As a result, the energy of the radio wave irradiated to the antenna pattern 9 are suppressed from accumulating and generating heat. It is noted that the overall length of the antenna pattern 9 may be shorter than the wavelength of ½ of the electromagnetic wave of the first frequency and longer than the wavelength of ½ of the electromagnetic wave of the second frequency because the radiation resistance does not rapidly decrease even if the overall length is longer than the wavelength of ½ of the electromagnetic wave of the second frequency. Thus, it is possible to cope with a case where the antenna wavelength becomes long due to the permittivity of the product by attaching the RFID tag to the product, and it is possible to change the electrical length of the antenna pattern 9 in consideration of the reading characteristic of the RFID tag at the first frequency.

Figure 3:
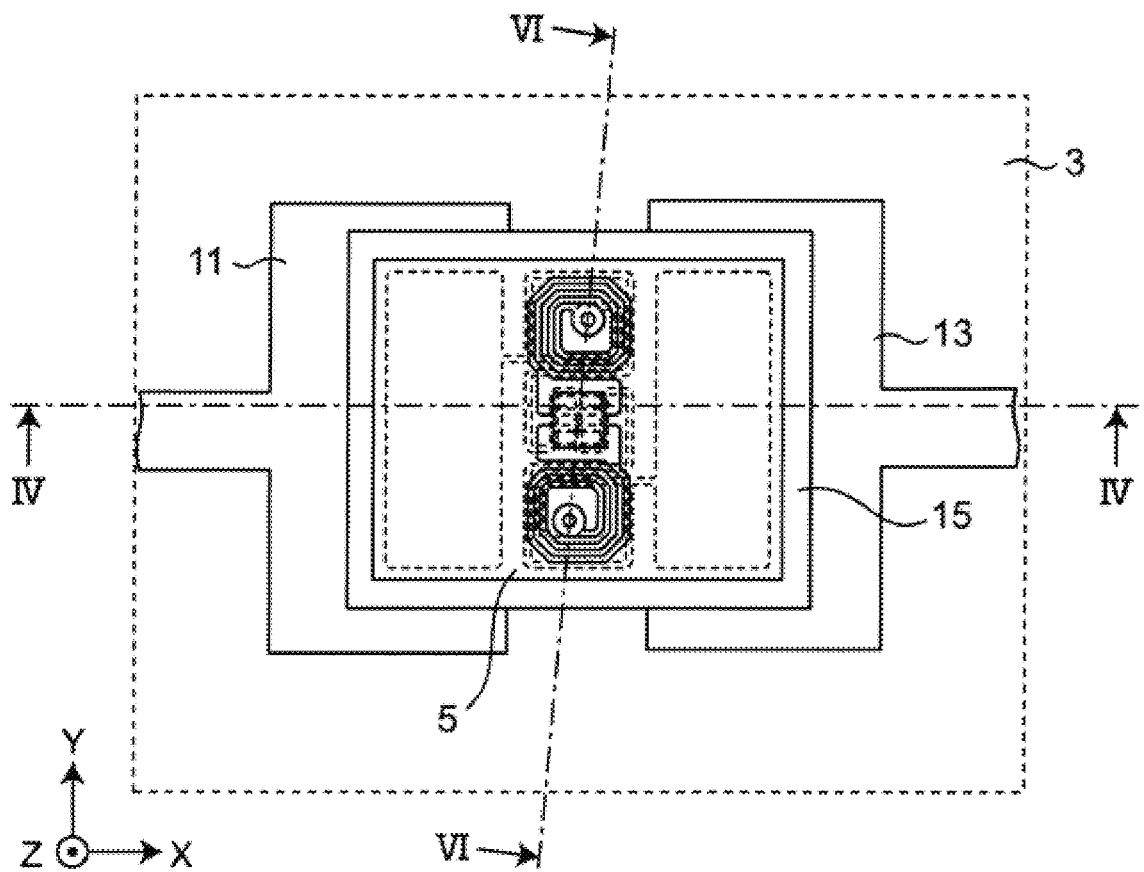
FIG. 3 is a perspective plan view of the RFIC module.
Figure 4:
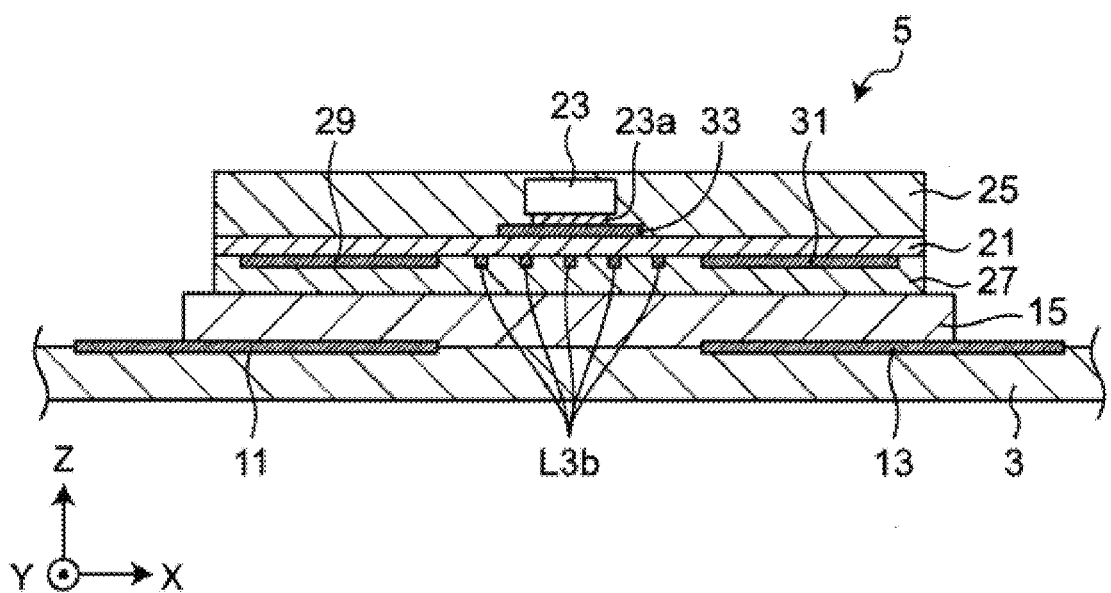
FIG. 4 is a cross-sectional view taken along an arrow IV in FIG. 3.
Figure 5A:
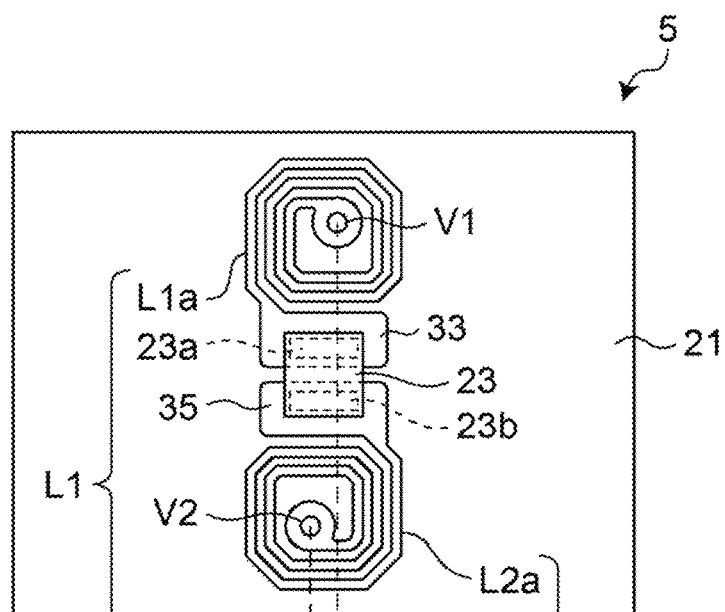
FIGS. 5a and 5b show plan views of a conductor pattern formed on a substrate of the RFIC module. Specifically.
Figure 5B:
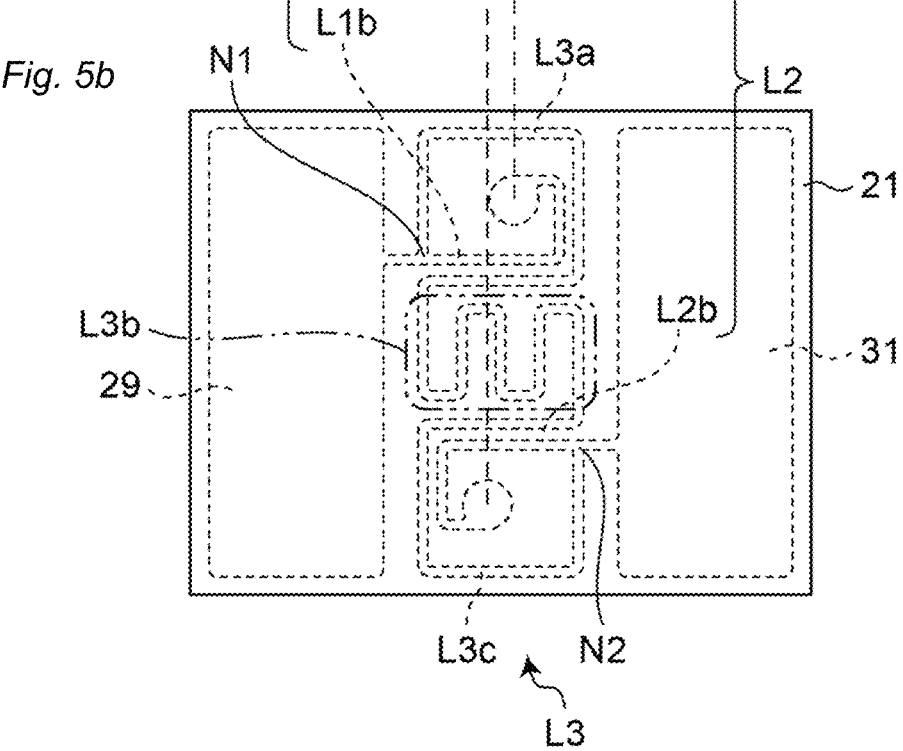
Figure 6:
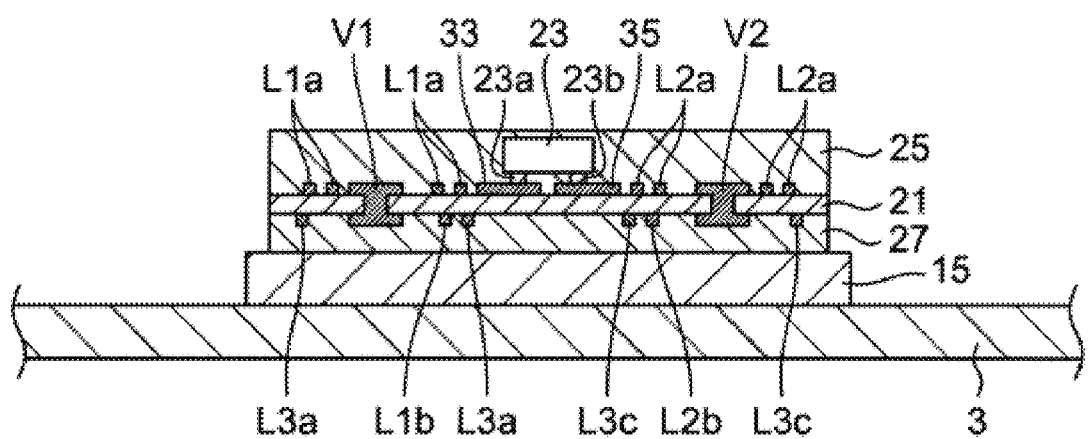
FIG. 6 is a cross-sectional view taken along an arrow VI in FIG. 3.

Next, the configuration of the RFIC module 5 will be described with reference to FIGS. 3 to 6. FIG. 3 is a perspective plan view of the RFIC, and FIG. 4 is a cross-sectional view taken along the arrow IV in FIG. 3. FIGS. 5a and 5b show plan views of the conductor pattern formed on the substrate of the RFIC module. More specifically, FIG. 5a is a plan view of the conductor pattern formed on the top surface of the substrate of the RFIC module. FIG. 5b is a perspective plan view of the conductor pattern formed on the bottom surface of the substrate viewed from above. FIG. 6 is a cross-sectional view taken along the arrow VI in FIG. 3.

As shown in FIG. 3, the RFIC module 5 is bonded to the upper surface of each of the first electrode 11 and the second electrode 13 via an adhesive 15 such as a double-sided tape or a synthetic resin, for example.

As shown in FIG. 4, the RFIC module 5 includes a substrate 21 and an RFIC 23 mounted on the substrate 21.

The substrate 21 is a flexible substrate, such as polyimide, for example. A protective film 25 is formed on the upper surface of the substrate 21 mounted with the RFIC 23. The protective film 25 is, for example, an elastomer such as polyurethane or a hot-melt agent such as ethylene vinyl acetate (EVA). Moreover, a protective film 27 is also attached to the lower surface of the substrate 21. The protective film 27 is a coverlay film such as a polyimide film (e.g., kapton tape), for example. Therefore, since all of the substrate 21, the protective film 25, and the protective film 27 have flexibility, the entire RFIC module 5 also has flexibility.

Referring now to FIGS. 5a and 5b, on the upper surface of the substrate 21, a fifth electrode 33, a sixth electrode 35, a conductor pattern L1a of a main part of a first inductance element L1, and a conductor pattern L2a of a main part of a second inductance element L2 are formed. The fifth electrode 33 is connected to one end of the conductor pattern L1a, and the sixth electrode 35 is connected to one end of the conductor pattern L2a. These conductor patterns are obtained by patterning, for example, a copper foil by photolithography.

On the lower surface of the substrate 21, a third electrode 29 and a fourth electrode 31 are formed that are capacitively coupled to the first electrode 11 and the second electrode 13, respectively, of the loop pattern 7. On the lower surface of the substrate 21, a conductor patterns Lib of a part of the first inductance element L1, conductor patterns L3a, L3b (conductor patterns surrounded by two-dot chain lines), and L3c of a third inductance element L3 are formed. These conductor patterns are also obtained by patterning, for example, a copper foil by photolithography.

One end of the conductor pattern Lib of a part of the first inductance element L1 and one end of the conductor pattern L3a of the third inductance element L3 are connected to the third electrode 29. Similarly, one end of the conductor pattern L2b of the second inductance element L2 and one end of the conductor pattern L3c of the third inductance element L3 are connected to the fourth electrode 31. The conductor pattern L3b is connected between the other end of the conductor pattern L3a of the third inductance element L3 and the other end of the conductor pattern L3c.

The other end of the conductor pattern Lib of the first inductance element L1 and the other end of the conductor pattern L1a of the first inductance element L1 are connected via a via conductor V1. Similarly, the other end of the conductor pattern L2b of the second inductance element L2 and the other end of the conductor pattern L2a of the second inductance element L2 are connected via a via conductor V2.

According to an exemplary aspect, the RFIC 23 is mounted on the fifth electrode 33 and the sixth electrode 35 formed on the upper surface of the substrate 21. That is, a terminal 23a of the RFIC 23 is connected to the fifth electrode 33, and a terminal 23b of the RFIC 23 is connected to the sixth electrode 35.

The first inductance element L1 and the conductor pattern L3a of the third inductance element L3 are formed in different layers of the substrate 21 from each other, and a coil opening of the first inductance element L1 and a coil opening of the third inductance element L3 are arranged in an overlapping relationship. Similarly, the second inductance element L2 and the conductor pattern L3c of the third inductance element L3 are formed in different layers of the substrate 21 from each other, and a coil opening of the second inductance element L2 and a coil opening of the third inductance element L3 are arranged in an overlapping relationship. The RFIC 23 is positioned on the surface of the substrate 21 between the second inductance element L2, the conductor pattern L3c of the third inductance element L3 and the first inductance element L1, the conductor pattern L3a of the third inductance element L3.

In the RFIC module 5, a first current path CP1 passing through the upper surface and the lower surface of the substrate 21 and a second current path CP2 passing through the lower surface of the substrate 21 are formed. The first current path CP1 passes from the third electrode 29 through a branch point N1, the conductor pattern Lib, the conductor pattern L1a, the RFIC 23, the conductor pattern L2a, the conductor pattern L2b, and a branch point N2, and reaches the fourth electrode 31. The second current path CP2 passes from the third electrode 29 through the branch point N1, the conductor pattern L3a, the conductor pattern L3b, the conductor pattern L3c, and the branch point N2, and reaches the fourth electrode 31. Here, the winding direction of the current flowing through the first inductance element L1 including the conductor pattern Lib connected to the conductor pattern L1a via the via conductor V1 and the second inductance element L2 including the conductor pattern L2b connected to the conductor pattern L2a via the via conductor V2 is reversed, and the magnetic field generated by the first inductance element L1 and the magnetic field generated by the second inductance element L2 cancel each other. The first current path CP1 and the second current path CP2 are formed in parallel to each other between the third electrode 29 and the fourth electrode 31.

Figure 7:
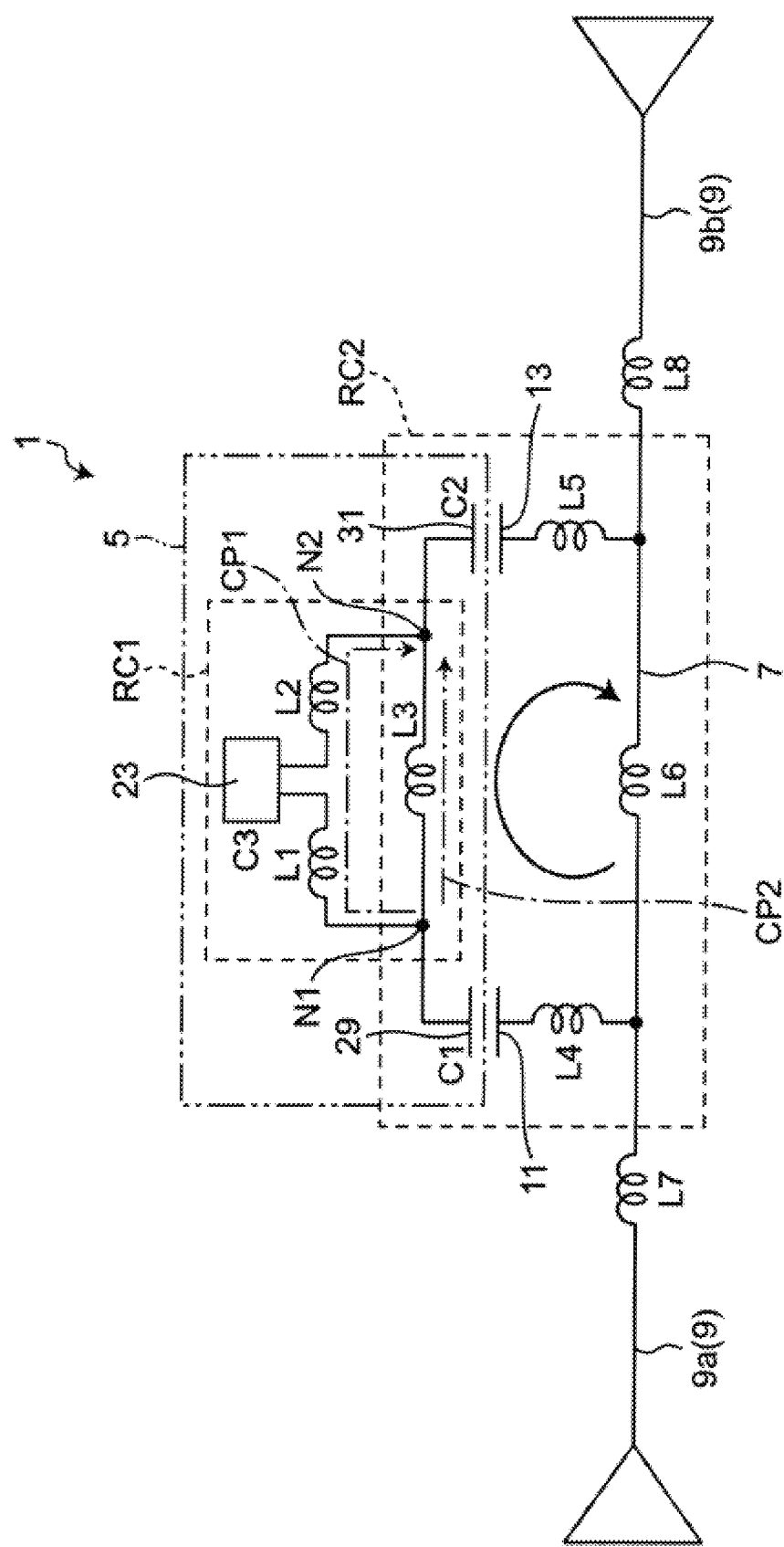
FIG. 7 is a circuit diagram of the RFID tag.

Next, the circuit configuration of the RFID tag 1 will be described with reference to FIG. 7. FIG. 7 is a circuit diagram of the RFID tag 1.

As shown in the RFIC module 5, the current path flowing in the RFIC module changes between the radio wave of the communication frequency and the electromagnetic wave from the microwave oven. Since the first current path CP1 is a part of a first resonance circuit RC1, which is an LC parallel resonance circuit, and matches the radio waves of the communication frequency, a current flows to the RFIC 23 through the loop pattern 7 when the antenna pattern 9 receives a radio wave of the communication frequency. Since the first current path CP1 has the capacitive RFIC 23, the first current path CP1 is capacitive with respect to the frequency of the microwave oven.

Figure 8:
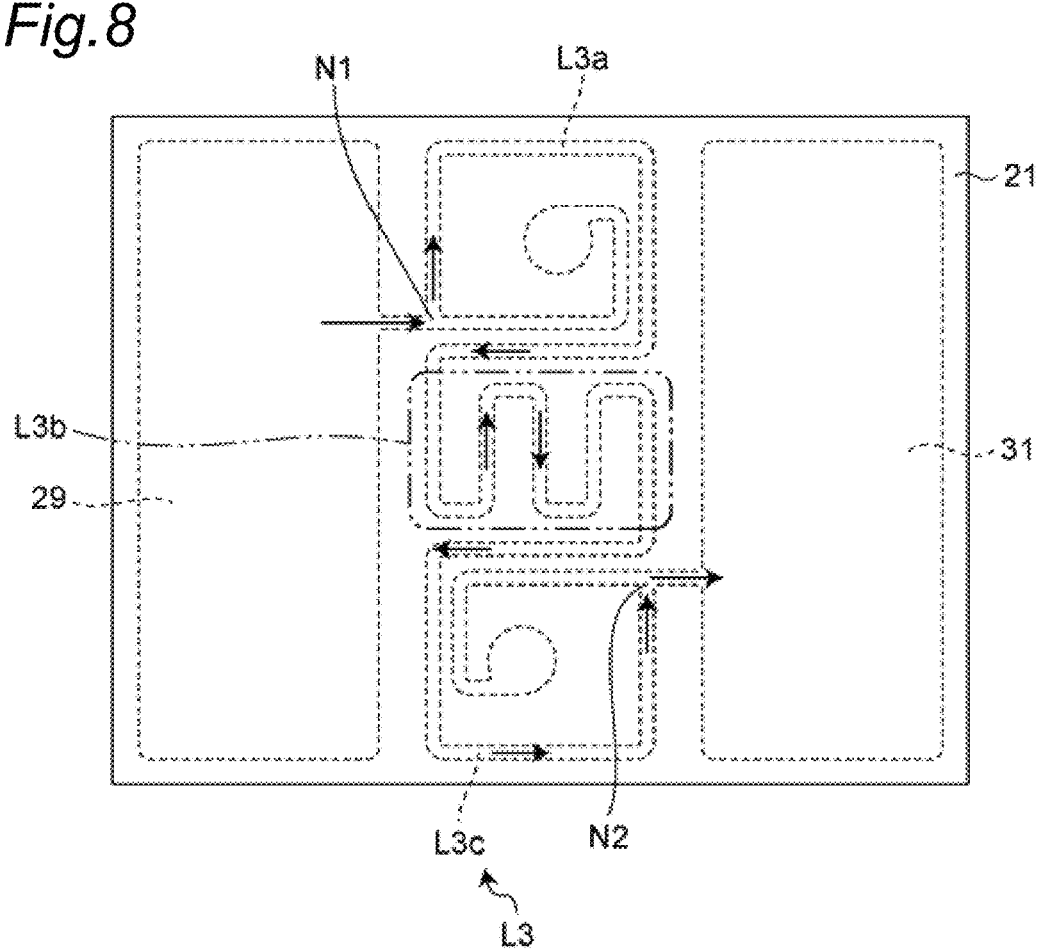
FIG. 8 is a view showing a current flow when receiving a signal at a heating frequency (2.4 GHz) used in an electromagnetic wave heating device (e.g., a "microwave oven").

Since the third inductance element L3 is inductive with respect to the frequency of the microwave oven, an overcurrent tends to flow in the second current path CP2 having an inductive impedance, rather than the first current path CP1 having a capacitive impedance with respect to the frequency of the microwave oven. Therefore, even if an electromagnetic wave having a frequency of the microwave oven is irradiated, as shown in FIG. 8, since an overcurrent flows through the second current path CP2 between the branch points N1 and N2, high voltage can be prevented from being applied between the capacitances of the RFIC 23. As a result, even if the RFID tag 1 is irradiated with an electromagnetic wave from the microwave oven, the RFIC 23 can be prevented from being broken, and communication with the RFID tag 1 can be performed even after the product attached with the RFID tag 1 is heated by the microwave oven.

The circuit configuration of the RFID tag 1 can also be described from another viewpoint as follows. As shown in FIG. 7, the first resonance circuit RC1 and the second resonance circuit RC2 are formed on the RFID tag 1. The first resonance circuit RC1 is a loop circuit including the first inductance element L1, the RFIC 23, the second inductance element L2, and the third inductance element L3.

Moreover, the second resonance circuit RC2 is a loop circuit including a capacitance C1, the third inductance element L3, a capacitance C2, a fourth, fifth, and sixth inductance elements L4, L5, and L6. The capacitance C1 includes the first electrode 11, the third electrode 29, the adhesive 15, and the protective film 27. The capacitance C2 includes the second electrode 13, the fourth electrode 31, the adhesive 15, and the protective film 27. The fourth, fifth, and sixth inductance elements L4, L5, and L6 are each an inductance component of the loop pattern 7. In FIG. 7, a seventh inductance element L7 is an inductance component of the first antenna pattern 9a, and an eighth inductance element L8 is an inductance component of the second antenna pattern 9b.

According to the exemplary aspect, the first resonance circuit RC1 is configured so as to perform LC parallel resonance by impedance matching with a radio wave at a communication frequency. Thus, even if the antenna pattern 9 is a dipole antenna with respect to the heating frequency of the microwave oven, the antenna pattern 9 matches the RFIC at the communication frequency, and it is possible to secure the communication distance of the RFID tag 1 at the communication frequency. The first resonance circuit RC1 is designed so as not to resonate with respect to an electromagnetic wave from a microwave oven having a frequency higher than the communication frequency.

The second resonance circuit RC2 is designed so as to resonate in impedance matching with the radio wave at the communication frequency, and is designed so as to resonate at the frequency of the microwave oven or a frequency higher than the frequency of the electromagnetic wave from the microwave oven together with the antenna pattern 9. Since the second resonance circuit RC2 is a loop circuit, a potential difference between the capacitance C1 and the capacitance C2 becomes large when an electromagnetic wave from a microwave oven is irradiated. However, a large potential difference does not occur between both ends of the third inductance element L3, and a high voltage is not applied between both ends of the RFIC 23 connected to the third inductance element L3 via the first inductance element L1 and the second inductance element L2, and hence the RFIC 23 is not broken. Since the second resonance circuit RC2 has a circuit configuration including the inductance component and the capacitance component, consumption of electromagnetic wave energy as heat generation can be suppressed even when the electromagnetic wave from the microwave oven is irradiated.

As described above, the RFID tag 1 of the first embodiment is a wireless communication device for transmitting and receiving a high-frequency signal having the first frequency for communication in 900 MHz band, for example. The RFID tag 1 includes the first electrode 11, the second electrode 13 arranged at an interval from the first electrode 11, the loop pattern 7 having the first electrode 11 and the second electrode 13 as both ends, the antenna pattern 9 connected to the loop pattern 7, the third electrode 29 capacitively coupled to the first electrode 11, the fourth electrode 31 capacitively coupled to the second electrode 13, the RFIC 23 having a capacitive impedance at the frequency of a microwave oven, and the first current path CP1 and the second current path CP2 connected in parallel with each other between the third electrode 29 and the fourth electrode 31. The RFIC 23 is included in the first current path CP1, and the second current path CP2 has the inductive impedance at the frequency of the microwave oven. With such a configuration, even if the RFID tag 1 is irradiated with an electromagnetic wave having a frequency of a microwave oven higher than a frequency for communication, since the RFID tag 1 has a capacitive component between the first electrode 11 and the third electrode 29 and a capacitive component between the second electrode 13 and the fourth electrode 31, the generation of a high voltage in the gap portion 7a between the first electrode 11 and the second electrode 13 can be reduced. Furthermore, since the first current path CP1 and the second current path CP2 are connected in parallel between the third electrode 29 and the fourth electrode 31, even if a voltage due to an electromagnetic wave of a frequency of a microwave oven is applied between the third electrode 29 and the fourth electrode 31, most of the current flows through the second current path CP2 having the inductive impedance, and hence voltage is hardly applied to the first current path CP1, and voltage application to the RFIC 23 can be reduced. As a result, the RFID tag 1 is not broken and can communicate data even after the product with the RFID tag 1 attached is heated by the microwave oven, and hence it is possible to retain the product information even after heating. Moreover, it is also possible to write the data of completion of heating into the RFID tag 1.

In an exemplary aspect, the antenna pattern 9 has an electrical length of ½ wavelength of the electromagnetic wave of the second frequency. Thus, since the conductor resistance of the antenna pattern 9 is much smaller than the radiation resistance, it is possible to reduce the heating of the antenna pattern 9 by reflecting most of the radiated electromagnetic waves of the second frequency.

Moreover, the pattern width of the loop pattern may be larger than the pattern width of the antenna pattern 9. This configuration reduces the conductor resistance of the loop pattern 7 more than the conductor resistance of the antenna pattern 9, and also reduces the application of a high voltage to the loop pattern 7. In order to make the conductor resistance of the loop pattern smaller than the conductor resistance of the antenna pattern 9, not the pattern width, but the thickness of the loop pattern 7 may be made larger than the thickness of the antenna pattern 9, or different metal materials may be used for the loop pattern 7 and the antenna pattern 9.

In an exemplary aspect, the impedance of the RFIC 23 at the first frequency is capacitive.

The circuit including the loop pattern 7 and the second current path CP2 (i.e., the second resonance circuit RC2) and the antenna pattern 9 is a resonance circuit that resonates at the second frequency. Due to this configuration, when the electromagnetic wave of the second frequency is irradiated, a current flows through the circuit including the antenna pattern 9, the loop pattern 7, and the second current path CP2.

The circuit including the first current path CP1 and the second current path CP2, i.e., the first resonance circuit RC1, is a non-resonant circuit at the second frequency, and has an impedance characteristic that becomes a short circuit when the impedance is viewed from the RFIC 23 side at the second frequency, thereby barely generating a potential difference. For purposes of this disclosure, it is noted that the term "short circuit" includes not only a completely short-circuited state, but also a substantially short-circuited state. Thus, even if the electromagnetic wave of the second frequency is irradiated, the overcurrent can be suppressed from flowing through the first current path CP1.

Moreover, the antenna pattern is line-symmetrical with respect to the center line passing through the center of the RFIC in plan view.

As also shown, the antenna pattern 9 has a meander pattern extending in a meander shape.

The RFID tag 1 of the first exemplary embodiment includes the first resonance circuit RC1 including the first current path CP1 and the second current path CP2, and having an impedance characteristic of resonating at the first frequency and short-circuiting at the second frequency, the second resonance circuit RC2 including the loop pattern 7 and the second current path CP2, and resonating at the first frequency, and the RFIC 23 included in the first current path CP1. The antenna pattern 9 and the second resonance circuit RC2 resonate at the second frequency or a frequency higher than the second frequency. Thus, both the first resonance circuit RC1 and the second resonance circuit RC2 resonate in parallel with the high-frequency signal of the first frequency, which causes the voltage between both ends of the RFIC to become higher, and hence the communication characteristics are good. The circuit including the antenna pattern 9 and the second resonance circuit RC2 resonates with respect to an electromagnetic wave having the second frequency higher than the first frequency or having a frequency higher than the second frequency, and hence the circuit has an inductive impedance characteristic at the second frequency, but the first resonance circuit RC1 has an impedance characteristic that becomes a short circuit when the impedance is viewed from the RFIC 23 side, thereby hardly generating a potential difference. Since both the first resonance circuit RC1 and the second resonance circuit RC2 include the second current path CP2, a current flows in the second current path CP2 with respect to the electromagnetic wave of the second frequency, and hence a high voltage can be prevented from being applied to the first current path CP1 including the RFIC 23, and the RFIC 23 can be prevented from being broken. Therefore, even after the RFID tag 1 is irradiated with the electromagnetic wave of the second frequency, the RFID tag 1 is capable of communication data without breakage of the IC.

Due to the above configuration, even when the product with the RFID tag 1 attached of the first exemplary embodiment is dielectrically heated by the electromagnetic wave heating device (e.g., a microwave oven), the generation of discharge in the RFID tag 1 is greatly suppressed, and it is possible to suppress ignition in the product. In fact, under test conditions, the RFID tag 1 having the structure shown in FIG. 1 did not ignite even when it was inductively heated in a professional-use microwave oven (1800 W) for 1 minute. When the reading test of the RFID tag was conducted after induction heating, reading was successful.

Figure 9:
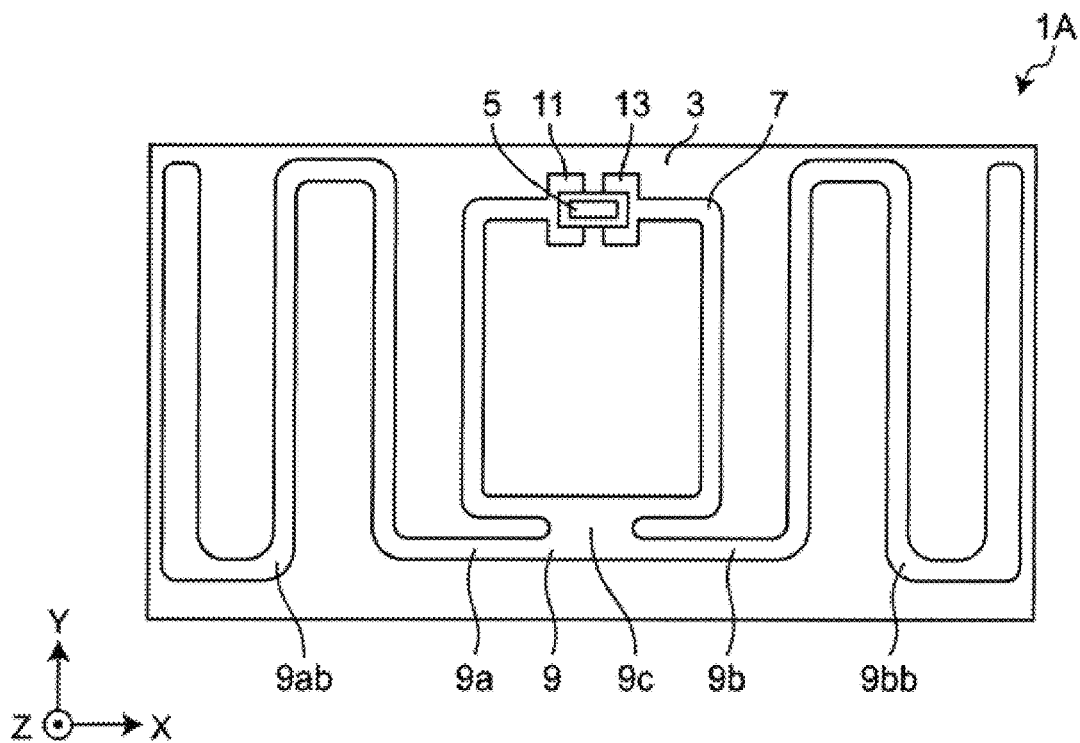
FIG. 9 is a plan view showing an RFID tag that is a wireless communication device in a variation of the first exemplary embodiment.

Next, a first variation of the first exemplary embodiment will be described. FIG. 9 is a plan view showing an RFID tag that is a wireless communication device in the first variation of the first embodiment. An RFID tag 1A in the first variation of the first embodiment has a configuration in which the flat plate-shaped wiring patterns 9ac is omitted from the first antenna pattern 9a of the RFID tag 1 of the first embodiment and the flat plate-shaped wiring patterns 9bc is omitted from the second antenna pattern 9b of the RFID tag 1 of the first embodiment. The other features of the configuration of the first exemplary embodiment are substantially the same as that of the RFID tag 1 described above. Such a configuration can achieve the same effect as that of the RFID tag 1 of the first embodiment.

Figure 10:
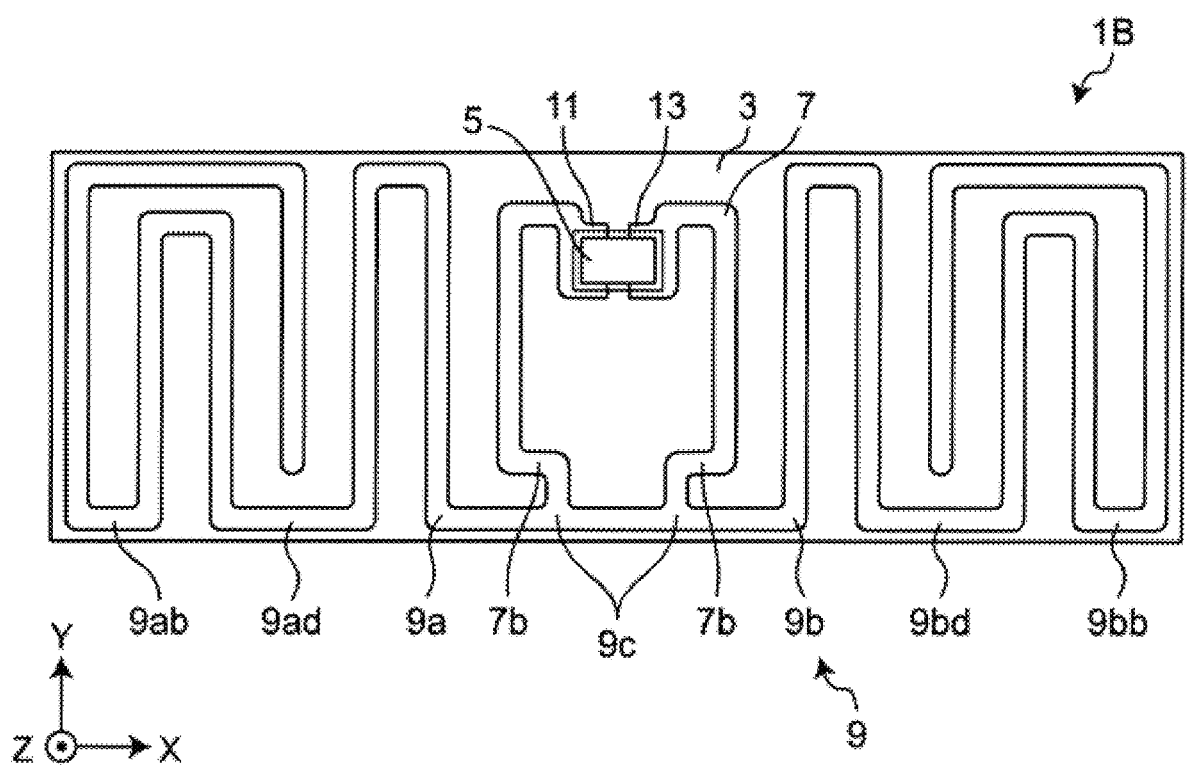
FIG. 10 is a plan view showing an RFID tag that is a wireless communication device in a variation of the first exemplary embodiment.

Next, a second variation of the first exemplary embodiment will be described. FIG. 10 is a plan view showing an RFID tag that is a wireless communication device in the second variation of the first embodiment. An RFID tag 1B in the second variation of the first embodiment has a configuration in which the flat plate-shaped wiring patterns 9ac is omitted from the first antenna pattern 9a of the RFID tag 1 and the flat plate-shaped wiring patterns 9bc is omitted from the second antenna pattern 9b of the RFID tag 1 of the first embodiment, and the tip portion of the meander pattern is arranged between folded portions 9ad and 9bd, respectively. The loop pattern 7 and the antenna pattern 9 are connected at two locations. The loop pattern has a stepped portion 7b extending stepwise from the connection portion 9c between the loop pattern 7 and the antenna pattern 9. The other features of the configuration of the first exemplary embodiment are substantially the same as that of the RFID tag 1 in the first embodiment. Such a configuration can achieve the same effect as that of the RFID tag 1 of the first embodiment.

Figure 11:
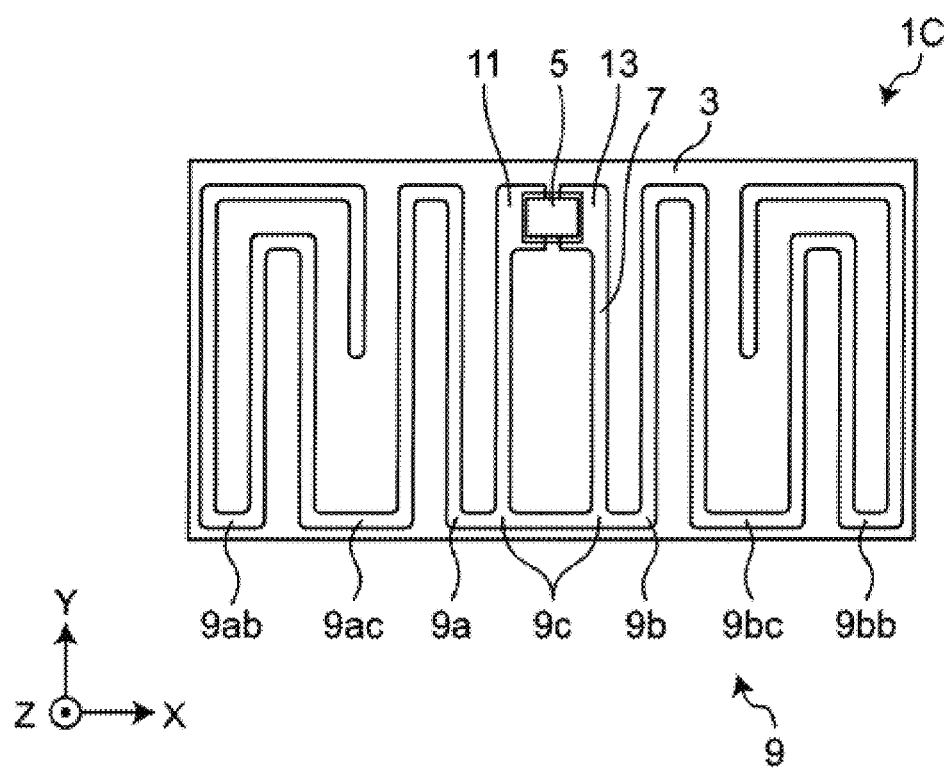
FIG. 11 is a plan view showing an RFID tag that is a wireless communication device in a variation of the first exemplary embodiment.

Next, a third variation of the first embodiment will be described. FIG. 11 is a plan view showing an RFID tag that is a wireless communication device in the third variation of the first exemplary embodiment. The loop pattern 7 of an RFID tag 1C in the third variation of the first embodiment is obtained by omitting the stepped portion 7b from the loop pattern 7 of the RFID tag 1B in the second variation of the first embodiment, and extends linearly from the connection portion 9c with the antenna pattern 9. The other features of the configuration of the first exemplary embodiment are substantially the same as that of the RFID tag 1 in the first embodiment. Such a configuration can achieve the same effect as that of the RFID tag 1 of the first embodiment. In fact, under test conditions, the RFID tag 1C having the structure shown in FIG. 11 did not ignite even when it was inductively heated in a professional-use microwave oven (1800 W) for 1 minute. When the reading test of the RFID tag was conducted after induction heating, reading was successful.

Second Exemplary Embodiment

Figure 12:
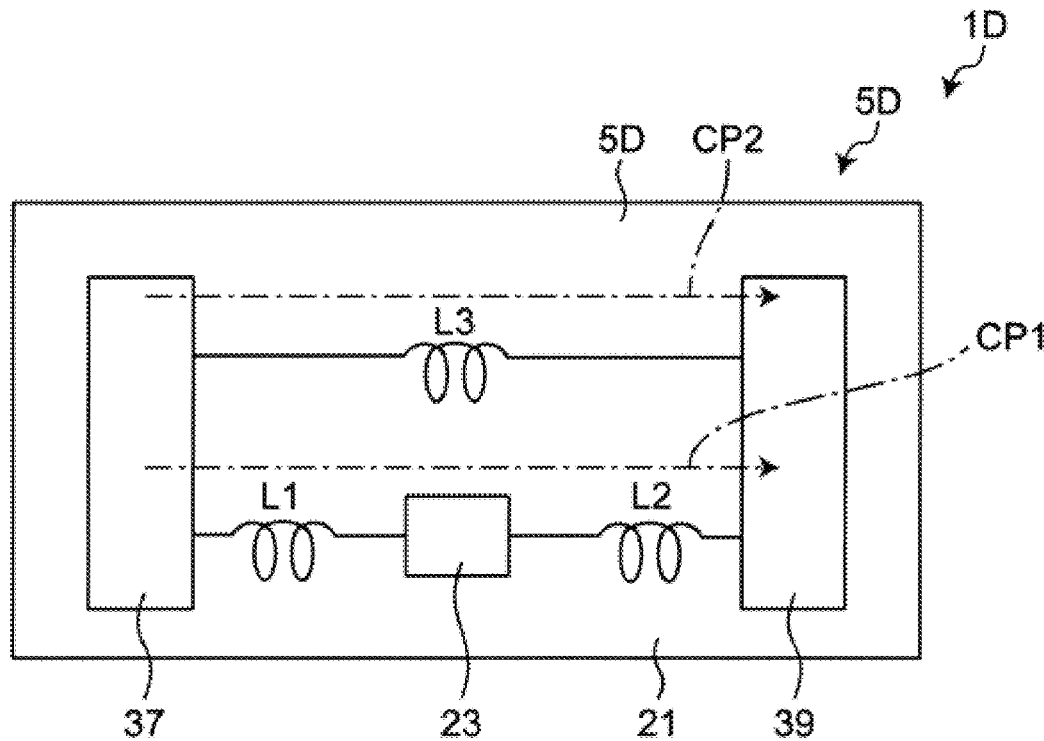
FIG. 12 is a plan view showing an RFIC module of a second exemplary embodiment.
Figure 13:
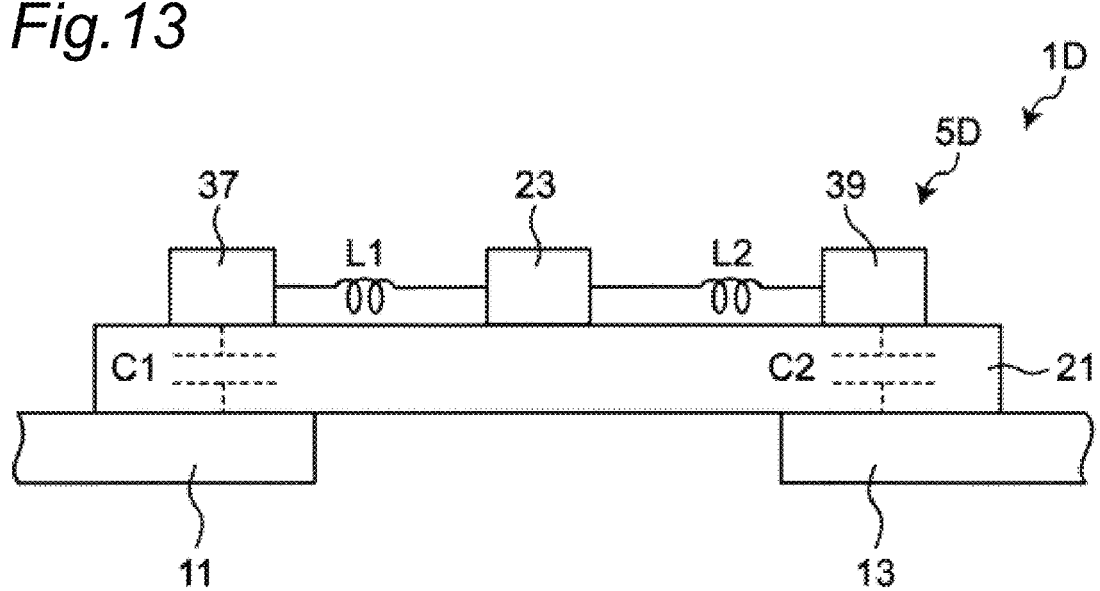
FIG. 13 is a side view showing the RFIC module of the second exemplary embodiment.

Hereinafter, an RFID tag 1D, which is a wireless communication device of the second exemplary embodiment, will be described with reference to FIGS. 12 and 13. FIG. 12 is a plan view showing an RFIC module 5D of the second embodiment. FIG. 13 is a side view showing the RFIC module 5D of the second embodiment.

The RFID tag 1D of the second embodiment will be described mainly regarding differences from the RFID tag 1 of the first embodiment. It is noted that in the description of the second embodiment, elements having the same configuration, operation, and function as those of the first embodiment are denoted by the same reference numerals, and some of the description thereof will be omitted in order to avoid redundant description. The RFID tag 1D of the second embodiment has the same configuration as that of the RFID tag 1 of the first exemplary embodiment except the points described below.

The RFID tag 1D of the second embodiment includes an RFIC module 5D having a circuit configuration different from that of the RFIC module 5 of the first embodiment. The RFIC module 5D of the second embodiment also has two current paths as in the first embodiment. The RFIC module 5D includes, across the substrate 21, a conductor pattern 37 formed on the upper surface of the substrate 21 facing the first electrode 11, and a conductor pattern 39 formed on the upper surface of the substrate 21 facing the second electrode 13. The capacitance C1 is formed between the first electrode 11 and the conductor pattern 37, and the capacitance C2 is formed between the second electrode 13 and the conductor pattern 39.

In the first current path CP1, the first inductance element L1, the RFIC 23, the second inductance element L2, and the conductor pattern 39 are connected in series from the conductor pattern 37. In the second current path CP2, which is formed in parallel with the first current path CP1, the conductor pattern 37 is connected in series to the conductor pattern 39 via the third inductance element L3.

Even such a configuration can achieve the same effect as that of the RFID tag 1 of the first embodiment.

Figure 14:
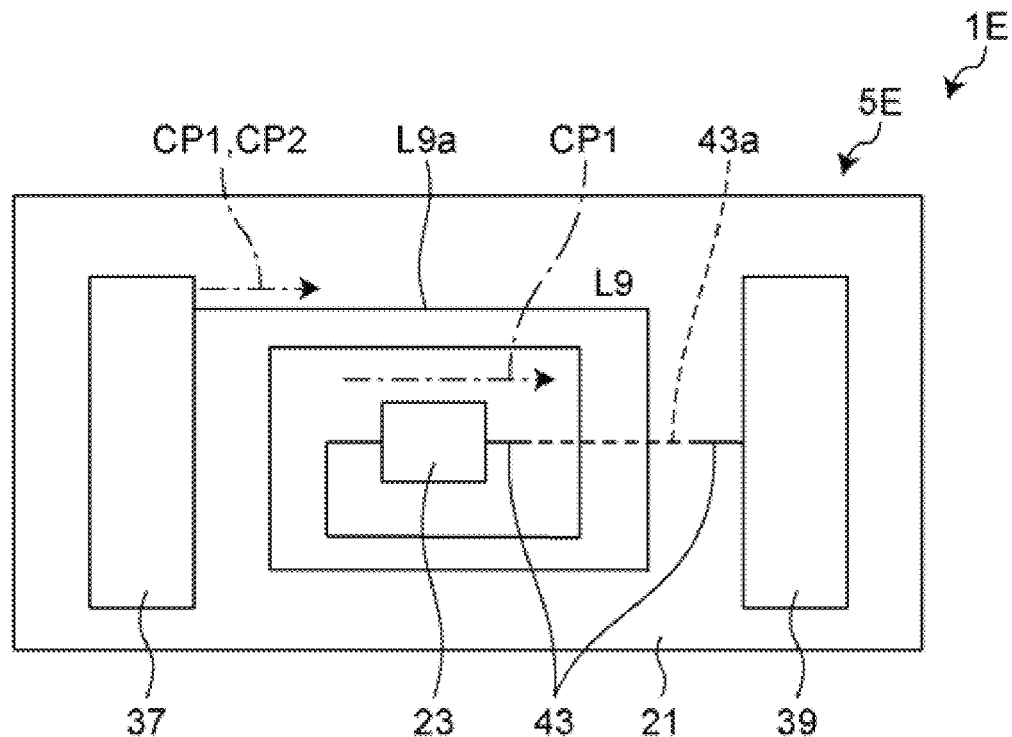
FIG. 14 is a plan view showing an RFIC module in a variation of the second exemplary embodiment.
Figure 15:
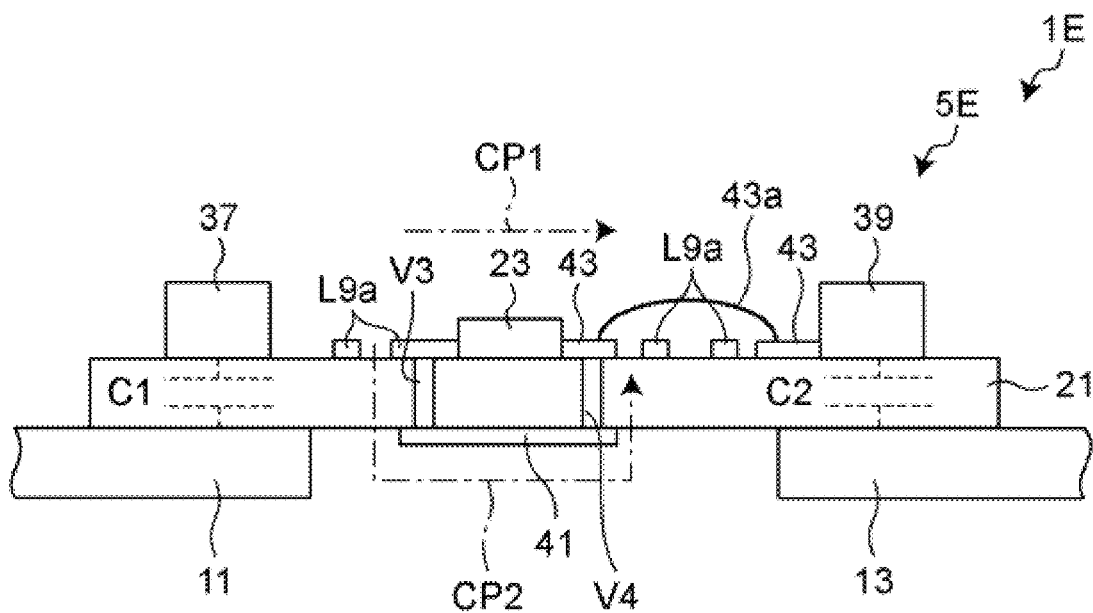
FIG. 15 is a side view showing the RFIC module in the variation of the second exemplary embodiment.

Next, an RFID tag 1E, which is a wireless communication device according to a variation of the second embodiment of the present invention, will be described with reference to FIGS. 14 and 15. FIG. 14 is a plan view showing an RFIC module 5E in a variation of the second embodiment. FIG. 15 is a side view showing the RFIC module 5E in the variation of the second embodiment.

In the RFIC module 5E of the RFID tag 1E in the variation of the second embodiment, the first current path CP1 and the second current path CP2 connected in parallel from the conductor pattern 37 to the conductor pattern 39 are formed by a conductor pattern L9a in which a ninth inductance element L9 is spiral. One end of the conductor pattern L9a is connected to the conductor pattern 37, and the other end thereof is connected to the RFIC 23. The vicinity of the other end of the conductor pattern L9a is connected to one end of a conductor pattern 41 via a via conductor V3. The other end of the conductor pattern 41 is connected to a conductor pattern 43 via a via conductor V4. One end of the conductor pattern 43 is connected to the RFIC 23, and the other end of the conductor pattern 43 is connected to the conductor pattern 39. The conductor pattern 43 includes a jump connection portion 43a in a part thereof.

The first current path CP1 passes from the conductor pattern 37 through the conductor pattern L9a, the RFIC 23, and the conductor pattern 43, and reaches the conductor pattern 39. The second current path CP2 passes from the conductor pattern 37 through the conductor pattern L9a, the via conductor V3, the conductor pattern 41, the via conductor V4, and the conductor pattern 43, and reaches the conductor pattern 39. The first current path CP1 and the second current path CP2 share the ninth inductance element L9 by the conductor pattern L9a. This configuration achieves the same effect as that of the RFID tag 1 of the first embodiment.

As described above, according to these embodiments, even when a product with a wireless communication device attached is erroneously heated in an electromagnetic wave heating device while the wireless communication device is attached, generation of discharge in the wireless communication device is suppressed. By setting the characteristic impedance viewed from the RFIC element at the frequency of the electromagnetic wave heating device to an impedance that causes short-circuit, a potential difference is hardly generated between both ends of the RFIC element, and hence the RFIC element is hardly broken. Thus, it is possible to provide a wireless communication device with high safety and reliability capable of suppressing ignition of the wireless communication device and further ignition of a product with the wireless communication device attached. Therefore, the exemplary embodiments of the present invention makes it possible to construct a system that communicates with the RFID tag 1, which is a wireless communication device, even after a product or food and drink is heated in a store or a restaurant that handles a wide variety of products such as foods and household goods.

It is noted that the present invention is not limited to the above exemplary embodiments, and can be modified as follows.

In the above embodiments, a flexible film material is used as the material of the base material 3, but the present invention is not limited thereto. The base material 3 may be, for example, a flame-retardant film material. When a flame-retardant film is used as the base material 3, a film obtained by adding a halogen-based flame-retardant material to a resin material such as polyethylene terephthalate (PET) resin or polyphenylene sulfide (PPS) resin or by coating a flame-retardant coating material is used as the flame-retardant film material. As the material of the base material 3, it is possible to use a resin material having a high function such as polyethylene naphthalate (PEN) resin having heat resistance. When these flame-retardant film materials are adopted as the base material 3, the patterns in the loop pattern 7 and the antenna pattern 9 can be prevented from approaching and coming into contact with each other because they do not shrink when the electromagnetic waves of the second frequency are received, and the generation of discharge and heat generation can be suppressed.

In the above embodiments, the first frequency band for communication is the UHF band, but the present invention is not limited thereto. The present invention may be configured to perform wireless communication with a high-frequency signal having a frequency (e.g., a carrier frequency) for communication in the HF band. In this case, the overall length of the antenna pattern is designed so as to receive high-frequency signals of the HF band. The HF band is a frequency band of 13 MHz or more and 15 MHz or less.

Although the present invention has been described in detail to some extent in each embodiment, the disclosure of these embodiments should be varied in the details of the configuration, and changes in the combination and order of elements in each embodiment can be achieved without departing from the scope and idea of the claimed invention.

DESCRIPTION OF REFERENCE CHARACTERS

1 RFID tag
3 Base material
5 RFIC module
7 Loop pattern
7a Gap portion
7b Stepped portion
9 Antenna pattern
9a First antenna pattern
9b Second antenna pattern
9c Connection portion
11 First electrode
13 Second electrode
15 Adhesive
21 Substrate
23 RFIC
23a Terminal
23b Terminal
25 Protective film
27 Protective film
29 Third electrode
31 Fourth electrode
33 Fifth electrode
35 Sixth electrode
37, 39, 41, 43 Conductor pattern 43a Jump connection portion
L1 First inductance element
L1a Conductor pattern
L2a Conductor pattern
L2 Second inductance element
L2a Conductor pattern
L2b Conductor pattern
L3 Third inductance element
L3a Conductor pattern
L3b Conductor pattern
L3c Conductor pattern
L4 Fourth inductance element
L5 Fifth inductance element
L6 Sixth inductance element
L7 Seventh inductance element
L8 Eighth inductance element
L9 Ninth inductance element
CL Center line
CP1 First current path
CP2 Second current path
C1 Capacitance
C2 Capacitance

The invention claimed is:

1. A wireless communication device for transmitting and receiving a signal having a first frequency for communication, the wireless communication device comprising:
 a loop pattern;
 a first electrode configured as a first end of the loop pattern;
 a second electrode arranged at an interval from the first electrode and configured as a second end of the loop pattern;
 an antenna pattern connected to the loop pattern;
 a third electrode capacitively coupled to the first electrode;
 a fourth electrode capacitively coupled to the second electrode;
 an RFIC having a capacitive impedance at a second frequency higher than the first frequency; and
 a first current path and a second current path connected in parallel with each other between the third electrode and the fourth electrode,
 wherein the RFIC is included in the first current path, and the second current path has an inductive impedance at a second frequency.

2. The wireless communication device according to claim 1, wherein the antenna pattern has an electrical length of ½ wavelength of an electromagnetic wave of the second frequency.

3. The wireless communication device according to claim 1, wherein a pattern width of the loop pattern is larger than a pattern width of the antenna pattern.

4. The wireless communication device according to claim 1, wherein the RFIC has a capacitive impedance at the first frequency.

5. The wireless communication device according to claim 1, further comprising a resonance circuit that includes the antenna pattern, the loop pattern, and the second current path and that is configured to resonate at the second frequency.

6. The wireless communication device according to claim 1, further comprising a circuit that includes the first current path and the second current path and that is a non-resonant circuit at the second frequency.

7. The wireless communication device according to claim 1, wherein the antenna pattern is line-symmetrical with respect to a center line passing through a center of the RFIC in a plan view.

8. The wireless communication device according to claim 1, further comprising:
 a base material on which the antenna pattern and the loop pattern are disposed, with the base material being constructed to not shrink when an electromagnetic wave of the second frequency is irradiated.

9. The wireless communication device according to claim 1, wherein the first frequency is a frequency of a UHF band.

10. The wireless communication device according to claim 1, wherein the first frequency is a frequency of a HF band.

11. The wireless communication device according to claim 1, wherein the second frequency is a frequency configured for electromagnetic wave heating.

12. The wireless communication device according to claim 1, further comprising:
 a substrate having upper and lower opposing surfaces;
 fifth and sixth electrodes disposed on the upper surface of the substrate; and
 a first conductor pattern of a first inductance element and a first conductor pattern of a second inductance element disposed on the upper surface of the substrate,
 wherein the fifth electrode is connected to one end of the conductor pattern of the first inductance element, and the sixth electrode is connected to one end of the conductor pattern of the second inductance element.

13. The wireless communication device according to claim 12,
 wherein the third and fourth electrodes are disposed on the lower surface of the substrate, and
 wherein a second conductor pattern of the first inductance element and first and second conductor patterns of a third inductance element are disposed on the lower surface of the substrate.

14. The wireless communication device according to claim 13,
 wherein one end of the second conductor pattern of the first inductance element and one end of the first conductor pattern of the third inductance element are connected to the third electrode, and
 wherein one end of a second conductor pattern of the second inductance element and one end of the second conductor pattern of the third inductance element are connected to the fourth electrode.

15. The wireless communication device according to claim 14, wherein the RFIC is mounted on the fifth electrode and the sixth electrode disposed on the upper surface of the substrate.

16. A wireless communication device for transmitting and receiving a signal having a first frequency for communication, the wireless communication device comprising:
 a loop pattern;
 an antenna pattern connected to the loop pattern;
 a first electrode configured as a first end of the loop pattern;
 a second electrode arranged at an interval from the first electrode and configured as a second end of the loop pattern;
 a third electrode capacitively coupled to the first electrode;
 a fourth electrode capacitively coupled to the second electrode;
 a first current path and a second current path connected in parallel with each other and arranged between the third electrode and the fourth electrode;
 a first resonance circuit that includes the first current path and the second current path and that has an impedance characteristic of resonating at the first frequency and short-circuiting at a second frequency higher in frequency than the first frequency;

a second resonance circuit that includes the loop pattern and the second current path, and that is configured to resonate at the first frequency; and an RFIC included in the first current path, wherein the antenna pattern and the second resonance circuit are configured to resonate at the second frequency or at a frequency higher than the second frequency.

17. The wireless communication device according to claim 16, wherein the antenna pattern has an electrical length of ½ wavelength of an electromagnetic wave of the second frequency.

18. The wireless communication device according to claim 16, wherein a pattern width of the loop pattern is larger than a pattern width of the antenna pattern.

19. The wireless communication device according to claim 16, wherein the RFIC has a capacitive impedance at the first frequency.

20. The wireless communication device according to claim 16, further comprising a resonance circuit that includes the antenna pattern, the loop pattern, and the second current path and that is configured to resonate at the second frequency.

* * * * *